US007131603B2

(12) United States Patent
Sakaida et al.

(10) Patent No.: US 7,131,603 B2
(45) Date of Patent: Nov. 7, 2006

(54) MICRO-MIST GENERATION METHOD AND APPARATUS

(75) Inventors: Atusi Sakaida, Nagoya (JP); Toshihisa Taniguchi, Handa (JP); Keikichi Takada, Takahama (JP); Kyoichi Takeda, Chita-gun (JP)

(73) Assignee: Denso Corporation, Kariya (JP)

( * ) Notice: Subject to any disclaimer, the term of this patent is extended or adjusted under 35 U.S.C. 154(b) by 140 days.

(21) Appl. No.: 10/853,008

(22) Filed: May 25, 2004

(65) Prior Publication Data

US 2005/0161523 A1 Jul. 28, 2005

(30) Foreign Application Priority Data

May 27, 2003 (JP) ............................ 2003-149428

(51) Int. Cl.
*A61M 11/06* (2006.01)

(52) U.S. Cl. ...................... 239/338; 239/346; 239/350; 239/370; 239/373

(58) Field of Classification Search ................ 239/338, 239/340, 346, 350, 369, 370, 372, 373
See application file for complete search history.

(56) References Cited

U.S. PATENT DOCUMENTS 1,839,193 A * 1/1932 Blanchard .................. 239/426
4,116,387 A * 9/1978 Kremer et al. .............. 239/338
4,637,493 A 1/1987 Ehlert
4,657,007 A * 4/1987 Carlin et al. ........... 128/200.18
5,209,225 A * 5/1993 Glenn .................. 128/200.14
5,775,594 A 7/1998 Tasaki et al.
6,230,843 B1 5/2001 Geiss

FOREIGN PATENT DOCUMENTS

| | | |
|---|---|---|
| CN | 1240897 | 1/2000 |
| CN | 1304802 | 7/2001 |
| JP | 4-22054 | 2/1992 |
| JP | 2001-148363 | 5/2001 |
| JP | 2002-052355 | 2/2002 |
| JP | 2002-158208 | 5/2002 |
| JP | 2002-190465 | 7/2002 |

* cited by examiner

*Primary Examiner*—Eric Keasel
*Assistant Examiner*—Jason Boeckmann
(74) *Attorney, Agent, or Firm*—Harness, Dickey & Pierce, PLC

(57) ABSTRACT

A liquid (10) stored in a generation chamber (2) is sprayed by an injection nozzle (33) using pressurized gas introduced to it. This strikes a buffer valve (4) where it is atomized. The generated mist is held in the generation chamber (2). The atomized generated mist is introduced into a particle classifier (5) and made to collide with a collision plate (52). The particles of less than 10 μm size bouncing off the collision plate are discharged as a micro-mist from a discharge port (56) and fed to a target workpiece. The large particles deposited on the collision plate are recovered in a generator.

14 Claims, 4 Drawing Sheets

DISTRIBUTION OF GENERATED MIST

MICRO-MIST GENERATION METHOD AND APPARATUS

CROSS REFERENCE TO RELATED APPLICATION

This application is related to and claims priority from Japanese Patent Application No. 2003-149428 filed on Jul. 21, 2004.

TECHNICAL FIELD

The present invention relates to a micro-mist generation method and apparatus able to atomize a fluid to the state of a micro-mist.

BACKGROUND

In recent years, interest in environmental issues has been rising. To meet with this, the need has been increasing for processing a workpiece while making the amount of chemical as small as possible. For example, in the processing field, achievement of a practical dry cutting technology has become urgent business. To efficiently cool the heat generated due to the processing, a cooling system utilizing the heat of vaporization of a small amount of water and large amount of air is necessary.

Figure 4B:
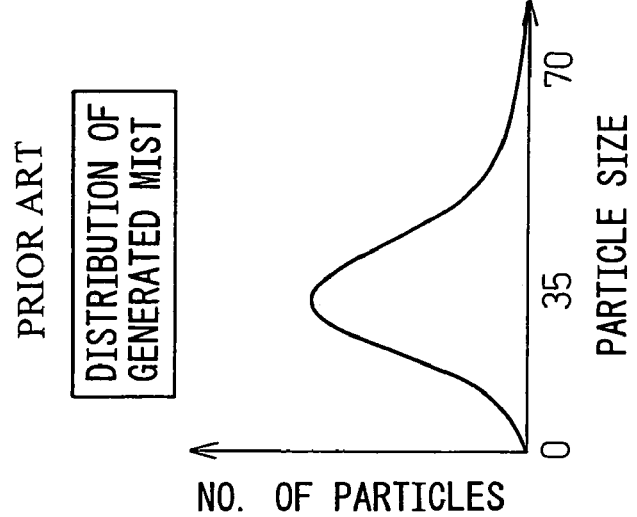
Figure 4A:
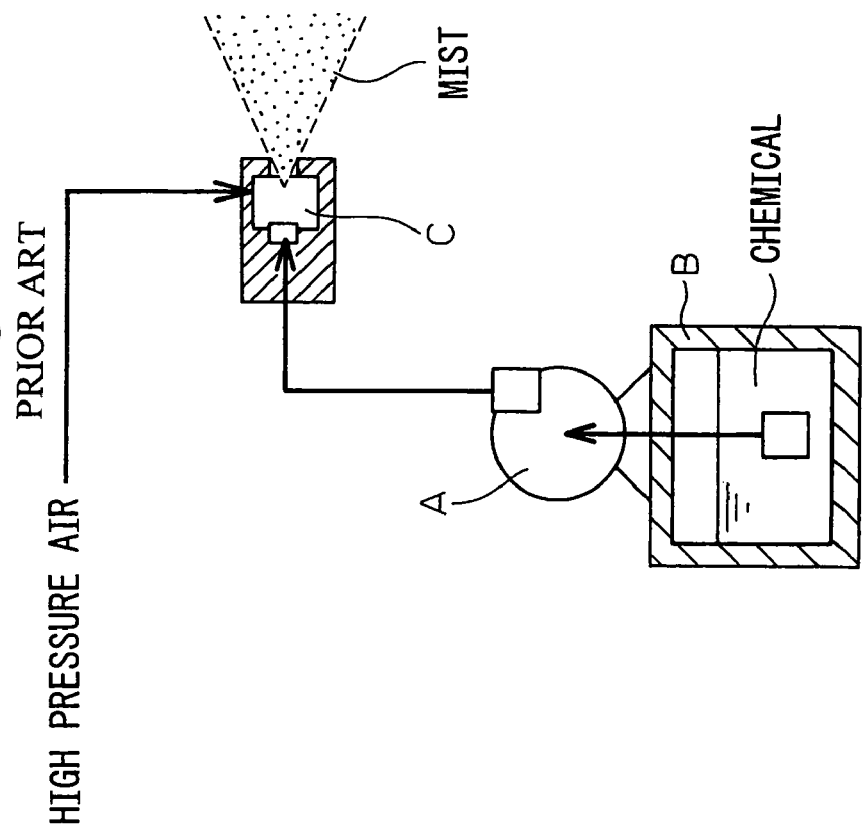

In the past, when converting a liquid to a mist (fine drops of liquid) and coating the processed surface or cooling the processed object, for example as shown in FIG. 4A, an atomization apparatus comprised of a pump A, chemical tank B, and nozzle C is used. By pressurizing a chemical in the chemical tank B, feeding it by the pump A to the small diameter nozzle C, and spraying the chemical from the nozzle C, it is converted to a mist. As a means for introducing a gas to this system to create a mixture of the atomized liquid and gas, a nozzle C for mixing a liquid and gas called a "two-fluid nozzle" is used and a high pressure gas (mainly high pressure air) is introduced into the two-fluid nozzle so as to create an atomized gas (cooling gas) converted into a micro-mist by the rapid expansion and diffusion action of the high pressure gas.

The distribution of the generated mist of the micro-mist created by this means (distribution of particle size and number of generated particles), as shown by the graph of FIG. 4B, includes a broad range of particles from large particles of about 70 μm to small particles of not more than 5 μm, has an average particle size of 30 μm or so, and differs in generated mist distribution due to the distance from the nozzle as well. Further, if using this atomization apparatus to make the ratio of the amount of air to the amount of liquid larger to a volume ratio of 1000:1, there is the problem of stable generation of mist becoming difficult.

When utilizing an atomization apparatus having this characteristic for an application such as cooling utilizing the latent heat of evaporation (heat of vaporization) without wetting the object for cutting or other processing, large particles of liquid deposited on the cooled surface, the cooling efficiency was inhibited, a large amount of ineffective liquid (chemical) was consumed, and environment problems were caused. To improve on this point, a system of dropping a liquid into a flow of air such as used for feeding fuel in a combustion engine etc. may be considered, but there would be the problems of the apparatus becoming large and a stable particle distribution and concentration not being able to be obtained. A satisfactory cooling effect could not be obtained.

SUMMARY

The present invention was made considering the above problem and has as its object the provision of a micro-mist generation method and apparatus enabling cooling, an etching reaction, etc., without wetting the surface, by a micro-mist (drops of liquid of less than 10 μm size) of an extent bouncing back at the processed surface particularly when processing (cooling, washing, etching, etc.) an object by a small amount of fluid (chemical).

The micro-mist generation method of a first aspect of the present invention comprises spraying a liquid stored in a generation chamber by an injection nozzle using introduced pressurized gas, making it collide with a buffer valve to atomize it and holding it in the generation chamber, introducing the atomized fine particles into a particle classifier and making them collide with a collision plate, and discharging the bounced back particles as micro-mist. Due to this, when for example used for cutting, it is possible to efficiently cool off the heat generated by the processing utilizing the heat of vaporization of a small amount of water and a large amount of air. This can be used for dry cutting technology. Further, when using a chemical as the liquid, a small amount of chemical is enough, so it is possible to prevent deterioration of the environment.

In the micro-mist generation method of the present invention, the micro-mist is comprised of fine particles of a liquid of not more than 10 μm size. Since the micro-mist is comprised of only small particles in this way, it is possible to efficiently utilize the latent heat of evaporation and cool without wetting the processed object. Further, in the case of a chemical, waste can be slashed and deterioration of the environment can be prevented.

In the micro-mist generation method of the present invention, the distance between the injection nozzle and the buffer valve is adjustable. Due to this, it is possible to adjust the state of distribution of the particles.

In the micro-mist generation method of the present invention, the flow rate of fine particles introduced into the particle classifier is adjustable. Due to this, the classification of the particles can be suitably adjusted. That is, large particles having a momentum exceeding the surface tension of the liquid deposit on the collision plate and form a liquid which is then recovered. The small particles bouncing off the collision plate are discharged as micro-mist. It is possible to adjust the classification criteria of the particles.

In the micro-mist generation method of the present invention, the particles colliding with and depositing on the collision plate of the particle classifier can be recovered as drops of liquid in the generation chamber. Due to this, it is possible to prevent large particles from being discharged outside, the cooling efficiency from being hindered, and the environment from being deteriorated and possible to prevent the liquid from being wasted.

The micro-mist generation apparatus of another embodiment of the present invention is provided with a generation chamber structured air-tight for storing the liquid and holding the generated mist, an injection nozzle spraying liquid into the generation chamber by a pressurized gas, a buffer valve which the sprayed mist collides with and is atomized by, and a particle classifier into which the atomized fine particles are introduced and classifying the particles and discharges only the micro-mist classified by the particle classifier. Due to this, only the small particle size micro-mist can be discharged, so it is possible to effectively cool the heat of processing produced due to cutting utilizing the latent heat of evaporation of the micro-mist.

In the micro-mist generation apparatus of the present invention, the distance between the buffer valve and the injection nozzle is adjustable. Due to this, it is possible to adjust the state of distribution of the atomized fine particles.

Figure 1:
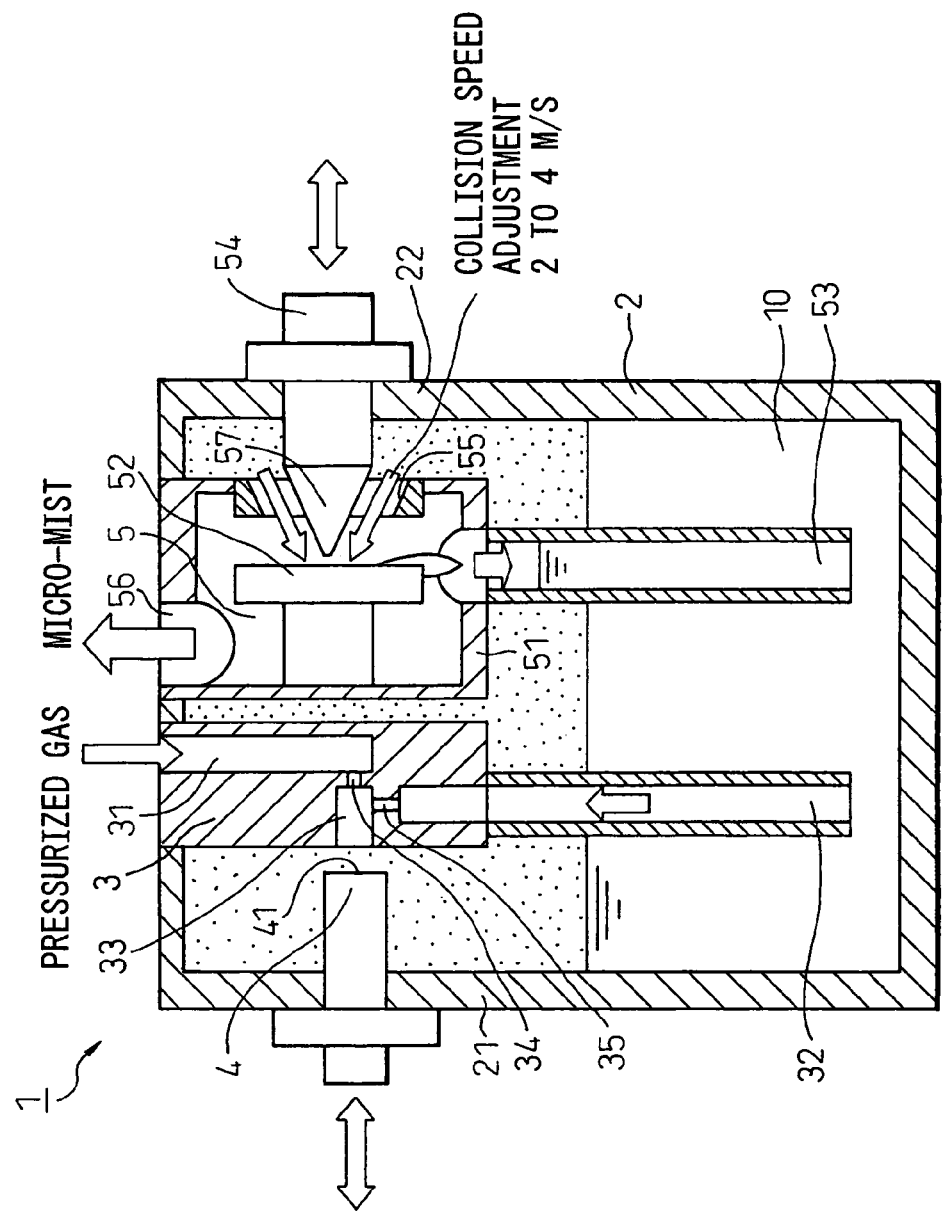
Figure 2A:
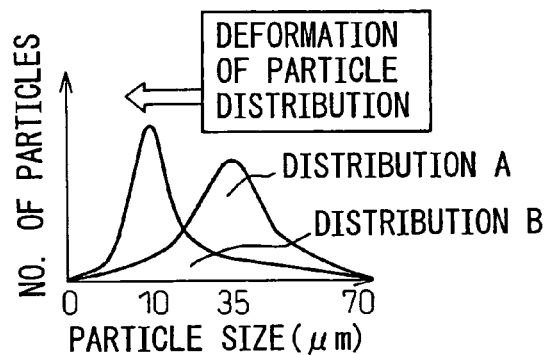

In the micro-mist generation apparatus of the present invention, the particle classifier is configured by a collision plate, particle size adjustment screw, separated liquid return pipe, and discharge port. By adjusting the flow rate of introduction of the fine particles introduced to the particle classifier, it is made possible to suitably select the distribution of particles of the micro-mist discharged.

The present invention will be more sufficiently understood from the attached drawings and the following description of the preferred embodiments.

BRIEF DESCRIPTION OF DRAWINGS

FIG. 1 is a schematic view for explaining the overall configuration of a micro-mist generation apparatus of an embodiment of the present invention and the principle of the micro-mist generation method.

FIGS. 2A, 2B, and 2C are graphs for explaining the process of conversion of the generated mist into micro-mist, wherein FIG. 2A is a graph of the function of a mist generator showing the distribution of particles before and after spray of an injection nozzle strikes a buffer valve, FIG. 2B is a graph of the function of a mist classifier showing the distribution of particles before and after colliding with a collision plate, and FIG. 2C is a graph of the characteristic of micro-mist showing the flow rate of particles before colliding with the collision plate and the particle size after colliding with it.

FIG. 3 is a view for explaining a specific example of application of the micro-mist generation apparatus of the present invention to cooling by a cutting tool.

FIGS. 4A and 4B are views for explaining a conventional atomization apparatus and the distribution of generated mist.

DETAILED DESCRIPTION

Below, a micro-mist generation method and micro-mist generation apparatus of an embodiment of the present invention will be explained with reference to the drawings. FIG. 1 is a view explaining the general overall configuration of a micro-mist generation apparatus of the present invention and the principle of the micro-mist generation method. The micro-mist generation apparatus 1 is comprised of a generation chamber 2, injection mechanism 3, buffer valve 4, particle classifier 5, etc.

The generation chamber 2 is structured air-tight for storing the ingredient of the mist constituted by a chemical, pure water, distilled water, or another liquid 10 and holding the generated mist generated in the generation chamber 2.

The injection mechanism 3 is arranged inside the generation chamber 2 and has an introduction pipe 31 for introducing pressurized gas (for example, pressurized air) from the outside, a feed pipe 32 for pumping up the liquid 10 stored in the generation chamber 2, and an injection nozzle 33. The introduction pipe 31 is connected by an injection orifice 34 to the injection nozzle 33, while the feed pipe 32 is connected by a feed orifice 35 to the injection nozzle 33. Therefore, the inside of the injection nozzle 33 acts as a kind of mixer. The rapid expansion and diffusion action of the pressurized gas introduced atomizes the sucked in liquid 10 and sprays it into the generation chamber 2. In the present embodiment, the inside diameter of the injection nozzle is 2 mm and the length is 4 mm, the diameter of the injection orifice 34 is 0.6 mm, and the diameter of the feed orifice 35 is 0.8 mm, but the invention is not limited to this.

The generation chamber 2 has the buffer valve 4 arranged inside it so as to face the injection nozzle 33. The buffer valve 4 is provided so as to pass through one side wall 21 of the generation chamber 2 and can slide in the left-right direction in FIG. 1. For example, the buffer valve 4 and the side wall 21 of the generation chamber 2 are screwed together. The buffer valve 4 can be turned to move in the left-right direction. Note that it is also possible to employ another movement system. The end face 41 of the buffer valve 4 facing the injection nozzle 33 is formed flat. In the present embodiment, the diameter of the end face 31 is 4 mm, but the invention is not limited to this. In this way, the facing distance between the injection nozzle 33 and buffer valve 4 can be adjusted. Therefore, the mist sprayed from the injection nozzle 33 collides with the end face 41 of the buffer valve 4 and thereby is atomized and is held in the generation chamber 2.

The generation chamber 2 is further provided with a particle classifier 5. The particle classifier 5 has a main body 51 forming a particle classification space, a collision plate 52 provided inside the main body 51, a separated liquid return pipe 53 returning the drops of liquid separated in the main body 51 to the storage part of the liquid 10 in the generation chamber 2, and an adjustment screw 54 for adjusting the flow rate of the fine particles introduced into the main body 51. Further, the main body 51 is formed with an introduction port 55 for guiding the fine particles held in the generation chamber 2 to the particle classification space and a discharge port 56 for discharging the micro-mist classified at the particle classification space (particles not more than 10 μm in size) to the outside.

The introduction port 55 forms a so-called "constriction" which becomes narrower in open area toward the inside. The collision plate 52 is arranged facing the introduction port 55. Further, the adjustment screw 54 is provided slidably at the left-right direction in FIG. 1 at the other side wall 22 of the generation chamber 2 so as to face the collision plate 52. In this case as well, the adjustment screw 54 is screwed into the side wall 22. By turning the adjustment screw 54, the adjustment screw 54 can be moved in the left-right direction. Further, the front end 57 of the adjustment screw 54 is formed conical. This front end 57 approaches the inside of the introduction port 55. Therefore, by moving the adjustment screw 54, it is possible to change the open area of the introduction port 55 and as a result possible to adjust the flow rate of the fine particles introduced into the particle classification space of the particle classifier The generated mist held in the generation chamber 2 in this way is introduced from the introduction port 55 of the particle classifier 5 into the particle classifier 5 and collides with the collision plate 52 by the adjusted flow rate. The large particles in the generated mist deposit on the collision plate 52 due to the collision, while the small particles bounce back and are discharged as micro-mist (particles of not more than 10 μm size) from the discharge port 56 to the outside. The large particles deposited on the collision plate 52 form drops of liquid which pass through the separated liquid return pipe 53 and are recovered at the storage part of the liquid 10 in the generation chamber 2.

Next, the operation (micro-mist generation method) of the micro-mist generation apparatus of the present invention configured in this way will be explained.

To generate a mist-like gas containing a micro-mist, a liquid 10 is stored in the generation chamber 2, and pressurized gas (for example, pressurized air) is introduced from the outside through the introduction pipe 31 and injected from the injection orifice 34 to the injection nozzle 33. Due to the negative pressure when this pressurized gas is injected, the liquid 10 is sucked in through the feed pipe 32 and sprayed from there into the generator 2 as a gas-liquid mixture in the injection nozzle 33. The operation up to here is similar to an atomization apparatus of the prior art. The state of distribution of the particles sprayed becomes the state as shown by the distribution A of FIG. 2A. That is, in the same way as the distribution of generation of the conventional two-fluid nozzle of FIG. 4B, particles of a wide range of particle sizes from large particles of about 70 μm to small particles of about 5 μm are included. In this case, particles of a particle size of about 35 μm are included in the greatest percentage.

Figure 2B:
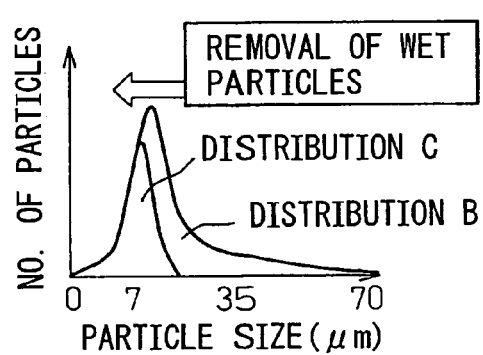
Figure 2C:
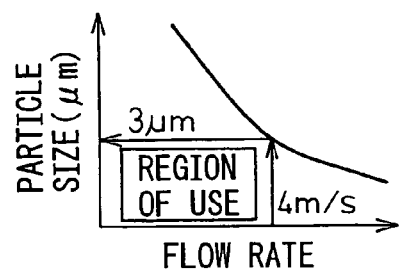
Figure 3:
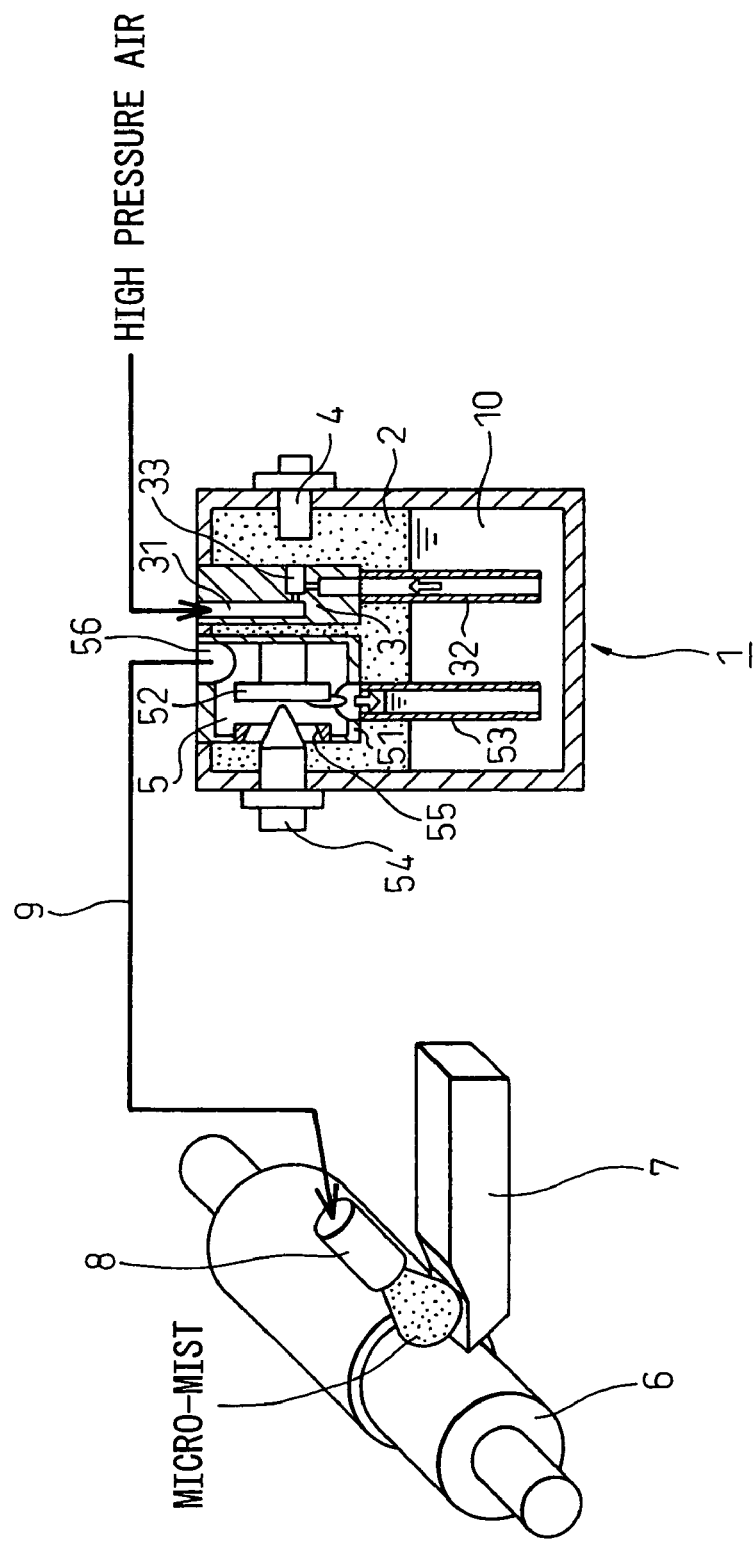

The mist sprayed from the injection nozzle 33 collides with the flat end face 41 of the buffer valve 4. In this case, by suitably adjusting the facing distance between the injection nozzle 33 and the buffer valve 4, part of the sprayed mist disperses due to the impact of the collision. The state of distribution of the particles becomes the state shown by the distribution B in FIGS. 2A and 2B. However, the majority of the particles increase in size due to the collision and become drops of liquid which are recovered at the storage part of the liquid 10. In the state of the distribution B, particles of a particle size of about 10 μm are included in the greatest percentage.

By repeating this action, the pressurized gas dissolves in the liquid 10 until reaching the saturated state and the effect is obtained of increasing the action of finely dividing the liquid by a slight pressure reduction. The generated mist is held in the generation chamber 2 in the state of the distribution B.

Due to the above action, the state of distribution of particles of the generated mist in the generation chamber 2 becomes the state of the distribution B, but does not reach the state of the micro-mist (particles of not more than 10 μm size) sought by the present invention. Numerous large sized particles (more than 10 μm) continue to be contained. For this reason, the generated mist rides the flow of the pressurized gas and flows from the introduction port 55 to the inside of the particle classifier 5. At the particle classifier 5, the open area of the introduction port 55 is suitably adjusted by the adjustment screw 54, so the generated mist is introduced into the particle classification space at a flow rate in accordance with the open area and collides with the collision plate 52. At this time, the large particles of the generated mist having a momentum exceeding the surface tension of the liquid 10 deposit on the collision plate 52 and form a liquid which passes through the separated liquid return pipe 53 and is returned to the storage part of the liquid 10 in the generation chamber 2 where it is recovered. The particles which do not deposit on the collision plate 52, but bounce back form a particle distribution shown by the distribution C of FIG. 2B. That is, only particles having a particle size of not more than 10 μm are contained. A particle size of about 7 μm is most prevalent. The thus obtained bounced back particles are discharged as micro-mist from the discharge port 56 of the particle classifier 5 and fed to the target workpiece.

FIG. 2C is a graph of the relationship between the flow rate of the generated mist when colliding with the collision plate 52 and the particle size of the particles obtained by the collision and shows for example that when the flow rate is 4 m/s, the most particles of a particle size of 3 μm are obtained. It shows that if the flow rate is increased, particles of a smaller particle size are obtained. In the present invention, preferably the open area of the introduction port 55 is adjusted so that the flow rate becomes about 2 to 4 m/s.

FIG. 3 shows a specific example of application of the micro-mist generation apparatus of the present invention to cooling a cutting tool for dry cutting. In FIG. 3, the micro-mist generation apparatus 1 is completely the same in configuration as FIG. 2 but with the left and right switched. In FIG. 3, reference numeral 3 indicates a workpiece, reference numeral 7 a cutting tool, and reference numeral 8 a cooling nozzle. The cooling nozzle 8 is connected to the discharge port 56 of the micro-mist of the micro-mist generation apparatus 1 through the micro-mist introduction pipe 9. Therefore, the micro-mist generated by the micro-mist generation apparatus 1 is sent together with the pressurized air by the micro-mist introduction pipe 9. By being blown out from the cooling nozzle 8 to the part which is processed, the processing heat is removed and processing performed. The processing heat at the interface between the workpiece 6 and the cutting tool 7 caused by cutting of the workpiece 6 by the cutting tool 7 can be efficiently cooled by the heat of vaporization of the water far exceeding the heat content of the air due to the cooling gas comprised of the large amount of air in which a small amount of liquid (water) is mixed.

The specific example of FIG. 3 shows an example of removal of the processing heat at the time of cutting, but the micro-mist generation method and apparatus of the present invention of course can also be applied to any kind of application so long as it involves a system for atomizing a fluid and feeding it together with a gas such as coating of a chemical, surface treatment (washing, etching), etc. Further, as a specific example, an extremely high combustion efficiency system can be realized if using the invention for a system feeding fuel mixed as a chemical with air.

As explained above, the micro-mist generation method and apparatus of the present invention enable a workpiece to be cooled and processed efficiently with a small amount of liquid (chemical) by simple hardware. Further, due to the effect of the nondepositing micro-mist, it is possible to transport the generated mist by piping over a long distance (several meters), so even spaces difficult to cool in the past can also be cooled by just introducing piping, and feed systems using that flexibility can be employed for difficult cooling needs, so it is possible to realize a reliable cooling action without being influenced by the spaces.

Further, in the micro-mist generation method of the present invention, the distribution of size and concentration of particles can be freely adjusted by the buffer valve and adjustment screw provided in the generation chamber, so the optimal feed conditions can be obtained and stable feed becomes possible.

Note that while the present invention was explained in detail based on specific embodiments, a person skilled in the art can make various changes, modifications, etc. without departing from the claims and ideas of the present invention.

The invention claimed is:

1. A micro-mist generation method for atomizing a liquid to a micro-mist and discharging the micro-mist, said micro-mist generation method comprising, providing a generation chamber;

storing a liquid within said generation chamber;

introducing said liquid and a pressurized gas into an injection nozzle;

spraying said liquid from said injection nozzle to make said liquid collide with a buffer valve in said generation chamber to generate atomized particles within said generator chamber;

providing a particle classifier defining a particle classification space separate from said generation chamber;

introducing said atomized particles into said particle classification space from said generation chamber and guiding said atomized particles toward a collision plate in said particle classification space; and discharging atomized particles from said particle classification space that bounce off said collision plate as said micro-mist.

2. A micro-mist generation method as set forth in claim 1, wherein said micro-mist is comprised of fine particles of a liquid of not more than 10 μm size.

3. A micro-mist generation method as set forth in claim 1, wherein a distance between said injection nozzle and said buffer valve is adjustable.

4. A micro-mist generation method as set forth in claim 1, wherein a flow rate of said atomized particles introduced into said particle classifier is adjustable.

5. A micro-mist generation method as set forth in claim 1, wherein atomized particles colliding with and depositing on said collision plate said particle classification space form drops of liquid which are recovered in said generation chamber.

6. A micro-mist generation method as set forth in claim 1, further comprising accessing said buffer valve from outside said generation chamber to adjust a distance between said buffer valve and said injection nozzle.

7. A micro-mist generation method as set forth in claim 6, further comprising accessing said particle classifier from outside said generation chamber to adjust a flow rate of said atomized particles introduced into said particle classification space.

8. A micro-mist generation method as set forth in claim 1, further comprising accessing said particle classifier from outside said generation chamber to adjust a flow rate of said atomized particles introduced into said particle classification space.

9. A micro-mist generation apparatus for atomizing a liquid to a micro-mist and discharging the micro-mist, said micro-mist generation apparatus comprising;

a generation chamber structured air-tight for storing the liquid, an injection nozzle arranged in said generation chamber for spraying said liquid in said generation chamber using pressurized gas;

a buffer valve disposed in the generation chamber such that the liquid sprayed by said injection nozzle collide with the buffer valve to generate atomized particles, and a particle classifier defining a classification space separate from and in communication with said generation chamber for classifying the atomized particles within the classification space an introduction port disposed between said generation chamber and said particle classifier for guiding the atomized particles into the particle classifier; and an outlet for discharging said atomized particles classified by said particle classifier as the micro-mist.

10. A micro-mist generation apparatus as set forth in claim 9, wherein a distance between said injection nozzle and said buffer valve is adjustable.

11. A micro-mist generation apparatus as set forth in claim 9, wherein said particle classifier comprises:

a collision plate for colliding with the atomized particles, a particle size adjustment screw for adjusting the flow rate of the atomized particles, a liquid return pipe recovering as drops of liquid particles of the atomized particles colliding with and depositing on said collision plate, and a discharge port for discharging particles of the atomized particles colliding with and bouncing back from said collision plate as the micro-mist.

12. A micro-mist generation apparatus as set forth in claim 9, wherein said buffer valve is accessible from outside said generation chamber to adjust a distance between said injection nozzle and said buffer valve.

13. A micro-mist generation apparatus as set forth in claim 12, wherein said particle classifier is accessible from outside said generation chamber to adjust a flow rate of said atomized particles into said classification space.

14. A micro-mist generation apparatus as set forth in claim 9, wherein said particle classifier is accessible from outside said generation chamber to adjust a flow rate of said atomized particles into said classification space.

* * * * *